United States Patent
Lee et al.

(10) Patent No.: US 12,498,510 B2
(45) Date of Patent: Dec. 16, 2025

(54) POLARIZING PLATE AND OPTICAL DISPLAY DEVICE COMPRISING SAME

(71) Applicant: SAMSUNG SDI CO., LTD., Yongin-si (KR)

(72) Inventors: Sang Hum Lee, Suwon-si (KR); Jung Hun You, Suwon-si (KR); Bong Choon Kim, Suwon-si (KR); Jun Mo Koo, Suwon-si (KR); Dong Yoon Shin, Suwon-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 630 days.

(21) Appl. No.: 17/905,165

(22) PCT Filed: Mar. 5, 2021

(86) PCT No.: PCT/KR2021/002727
§ 371 (c)(1),
(2) Date: Aug. 26, 2022

(87) PCT Pub. No.: WO2021/182800
PCT Pub. Date: Sep. 16, 2021

(65) Prior Publication Data
US 2023/0124800 A1    Apr. 20, 2023

(30) Foreign Application Priority Data
Mar. 10, 2020   (KR) .................. 10-2020-0029872

(51) Int. Cl.
*G02B 5/30*    (2006.01)

(52) U.S. Cl.
CPC .................. *G02B 5/3025* (2013.01)

(58) Field of Classification Search
USPC ................... 359/494.01; 349/96–98
See application file for complete search history.

(56) References Cited

U.S. PATENT DOCUMENTS

| | | | |
|---|---|---|---|
| 2013/0314644 A1 | 11/2013 | Okamura et al. | |
| 2016/0195767 A1* | 7/2016 | Lee | G02B 5/3033 359/486.01 |
| 2017/0131448 A1 | 5/2017 | Lee et al. | |
| 2018/0186109 A1 | 7/2018 | Byun et al. | |

(Continued)

FOREIGN PATENT DOCUMENTS

| | | |
|---|---|---|
| CN | 101137917 A | 3/2008 |
| CN | 101663152 A | 3/2010 |
| CN | 102422188 A | 4/2012 |

(Continued)

OTHER PUBLICATIONS

International Search Report of PCT/KR2021/002727, Jun. 18, 2021, 4 pp.

(Continued)

*Primary Examiner* — Dung T Nguyen
(74) *Attorney, Agent, or Firm* — Ricky Lam

(57) ABSTRACT

Provided are a polarizing plate and an optical display device comprising same, the polarizing plate comprising a polarizer and a protective film formed on at least one surface of the polarizer, wherein the polarizer has a depolarization region on at least a part thereof, and the polarizer has a crystallization degree of formula 1 of about 60% or greater.

14 Claims, 2 Drawing Sheets

(56) References Cited

U.S. PATENT DOCUMENTS

2019/0113666 A1    4/2019  Lee et al.

FOREIGN PATENT DOCUMENTS

| | | |
|---|---|---|
| CN | 105229500 A | 1/2016 |
| CN | 105393147 A | 3/2016 |
| KR | 20-2012-0006575 A | 9/2012 |
| KR | 10-2016-0130360 A | 11/2016 |
| KR | 10-2017-0037854 A | 4/2017 |
| KR | 10-2017-0068427 A | 6/2017 |
| KR | 10-2017-0083995 A | 7/2017 |
| KR | 10-2018-0111726 A | 10/2018 |
| KR | 10-2003367 B1 | 7/2019 |

OTHER PUBLICATIONS

Korean Office Action dated Jan. 30, 2023 issued in corresponding Korean Patent Application No. 10-2020-0029872.
Chinese Office Action dated Mar. 18, 2025, issued in corresponding Chinese Patent Application No. 2021800208120 (6 pages).

* cited by examiner

[FIG. 1a]
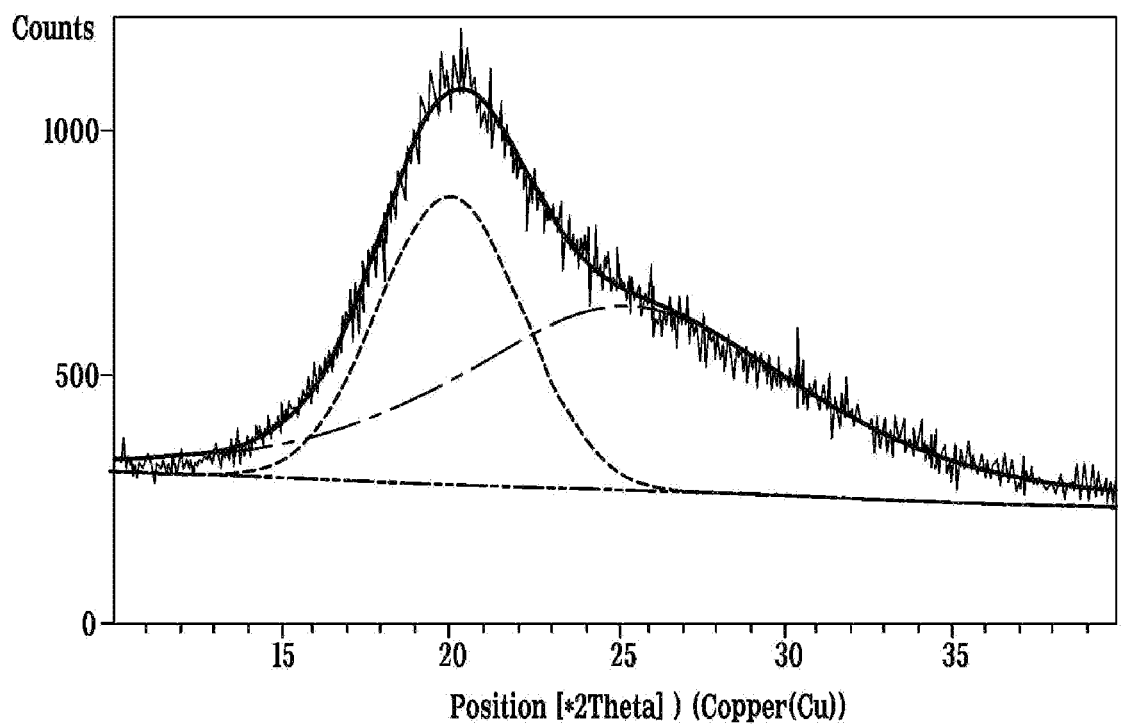
[FIG. 1b]
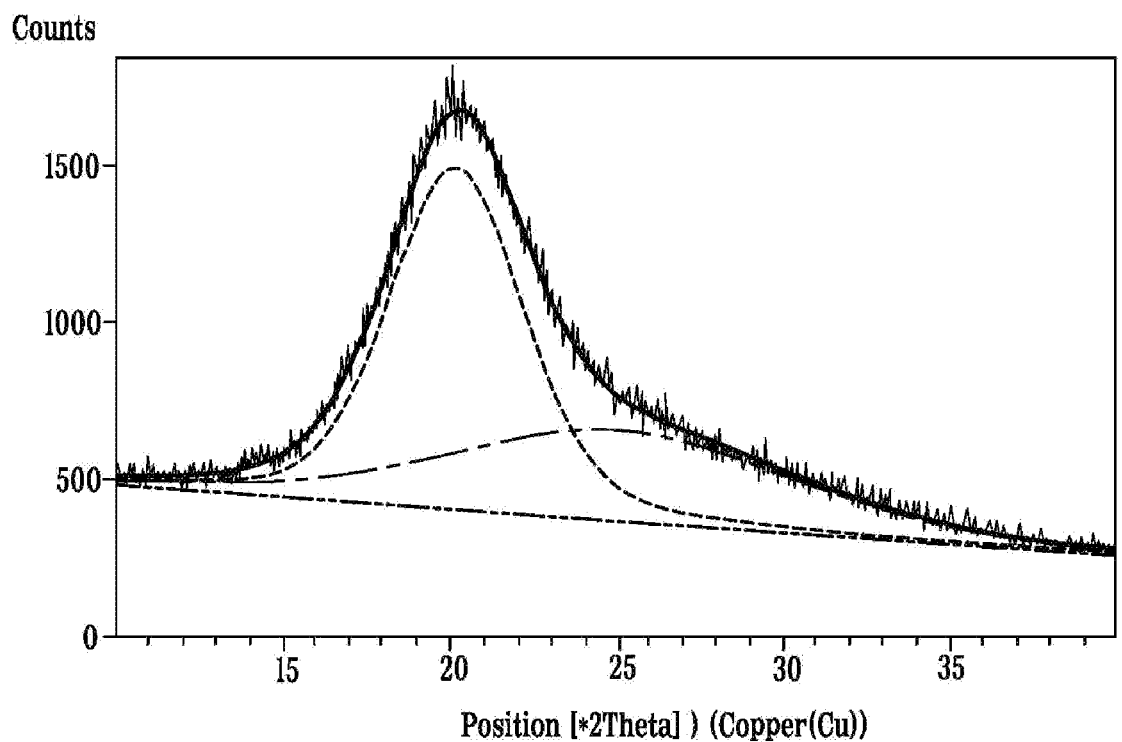

POLARIZING PLATE AND OPTICAL DISPLAY DEVICE COMPRISING SAME

CROSS-REFERENCE TO RELATED APPLICATIONS

This application is a U.S. National Phase Patent Application of International Application Number PCT/KR2021/002727, filed on Mar. 5, 2021, which claims priority to Korean Patent Application Number 10-2020-0029872, filed on Mar. 10, 2020, the entire content of each of which is incorporated herein by reference.

TECHNICAL FIELD

The present invention relates to a polarizing plate and an optical display device including the same.

BACKGROUND ART

A polarizing plate may be applied not only to a display device adapted to display an image but also to a display device adapted to photograph an external image through a camera. The display device may include a liquid crystal display, an organic light emitting diode display, and the like.

To this end, the polarizing plate is required to have both a polarization region having a fundamental function of the polarizing plate, that is, a polarization function, and a depolarization region for a camera. In the polarizing plate, the polarization region and the depolarization region are consecutively formed to coexist in a single polarizing plate, instead of being separated from each other.

As a method of forming the depolarization region in the polarizing plate, a chemical method using an alkali solution and the like, a physical method, or an optical method using femtosecond or picosecond laser irradiation is taken into account. However, the depolarization region formed by a typical method has a problem, such as lower durability than the polarization region or irregular roughness. The depolarization region is consecutive to the polarization region and has a smaller area than the polarization region. Accordingly, it is not easy to improve durability of the depolarization region alone in the polarizing plate. In particular, since the depolarization region is consecutive to the polarization region, the depolarization region having poor durability can affect durability of the polarization region. Accordingly, there is a need for development of a polarizing plate capable of realizing the depolarization region while improving durability of the entirety of the polarizing plate without generation of irregular roughness in the depolarization region.

The background technique of the present invention is disclosed in Korean Patent Laid-open Publication No. 10-2017-0037854 and the like.

DISCLOSURE

Technical Problem

It is one aspect of the present invention to provide a polarizing plate that has a depolarization region while securing good durability.

It is another aspect of the present invention to provide a polarizing plate that has a depolarization region while reducing light transmittance of the depolarization region after testing at high temperature and/or under high temperature/humidity conditions.

It is a further aspect of the present invention to provide a polarizing plate capable of providing a clear image through improvement in surface roughness of a depolarization region.

It is yet another aspect of the present invention to provide a polarizing plate that has the above effects and can be manufactured by a simple method.

Technical Solution

One aspect of the present invention relates to a polarizing plate.

1. The polarizing plate includes: a polarizer; and a protective film formed on at least one surface of the polarizer, wherein the polarizer is formed with a depolarization region on at least part thereof and has a crystallinity ratio of about 60% or more, as calculated by Equation 1.

$$\text{Crystallinity ratio} = DC2/DC1 \times 100 \qquad \text{[Equation 1]}$$

(In Equation 1,
   DC1 is a crystallinity of a region of the polarizer other than the depolarization region, and
   DC2 is a crystallinity of the depolarization region of the polarizer).
2. In 1, the depolarization region may have a total remaining-iodine content of about 0.1% by weight (wt %) to about 1.5 wt %.
3. In 1 to 2, the depolarization region may occupy an area ratio of about 20% or less in the polarizer.
4. In 1 to 3, the depolarization region may have a surface roughness (Ra) of about 3.0 nm or less.
5. In 1 to 4, the depolarization region may have a curved or flat outer surface not formed with irregular roughness.
6. In 1 to 5, the polarizer may further include a polarization region excluding the depolarization region and the polarizing plate may have a shrinkage rate of about 5% or less, as calculated by Equation 2.

$$\text{Shrinkage rate} = |L2-L1|/L1 \times 100, \qquad \text{[Equation 2]}$$

(In Equation 2,
   L1 is an initial length of the polarizer or the polarizing plate in an absorption axis direction thereof, and
   L2 is a length of the polarizer or the polarizing plate in the absorption axis direction thereof, after the polarizer or the polarizing plate is left at 85° C. for 120 hours).
7. In 6, the depolarization region and the polarization region may be consecutive to each other.

Another aspect of the present invention relates to an optical display device including the polarizing plate according to the present invention.

Advantageous Effects

The present invention provides a polarizing plate that has a depolarization region while securing good durability.

The present invention provides a polarizing plate that has a depolarization region while reducing light transmittance of the depolarization region after testing at high temperature and/or under high temperature/humidity conditions.

The present invention provides a polarizing plate capable of providing a clear image through improvement in surface roughness of a depolarization region.

The present invention provides a polarizing plate that has the above effects and can be manufactured by a simple method.

DESCRIPTION OF DRAWINGS

FIG. 1a and FIG. 1b are graphs depicting results of XRD analysis of a polarizer according to one embodiment of the present invention, in which FIG. 1a is a graph depicting a result of XRD analysis of a depolarization region and FIG. 1b is a graph depicting a result of XRD analysis of a polarization region.

BEST MODE

Figure 2:
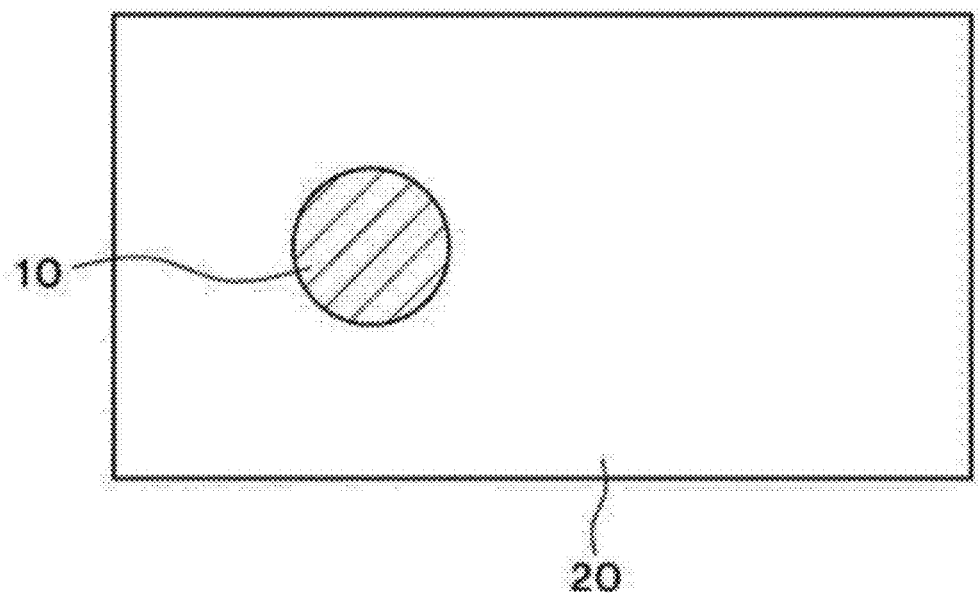
FIG. 2 is a top view of a polarizer having a depolarization region and a polarization region according to one embodiment of the present invention.

Hereinafter, embodiments of the present invention will be described in detail with reference to the accompanying drawings to provide thorough understanding of the invention to those skilled in the art. It should be understood that the present invention may be embodied in various ways and is not limited to the following embodiments. The present invention may include modifications of the following embodiments by those skilled in the art.

As used herein to represent a specific numerical range, "X to Y" means "greater than or equal to X and less than or equal to Y (X≤ and ≤Y)".

A polarizing plate according to one embodiment of the invention includes a polarizer and a protective film formed on at least one surface of the polarizer. In one embodiment, the polarizing plate includes a polarizer and protective films respectively formed on opposite surfaces of the polarizer. In another embodiment, the polarizing plate may include a polarizer and a protective film formed only on one surface of the polarizer.

The polarizer is formed with a depolarization region on at least part thereof and has a crystallinity ratio of about 60% or more, as calculated by Equation 1.

$$\text{Crystallinity ratio} = DC2/DC1 \times 100 \quad \text{[Equation 1]}$$

(In Equation 1,

DC1 is a crystallinity of a region of the polarizer other than the depolarization region, and DC2 is a crystallinity of the depolarization region of the polarizer).

The polarizer is composed of a depolarization region and other region excluding the depolarization region (the other region excluding the depolarization region will be referred to as "polarization region").

The "depolarization region" constitutes a portion of the polarizer and may mean an area having a light transmittance of about 60% or more, for example, about 60% to about 90%, for example, about 60% to about 70%, and a degree of polarization of about 50% or less, for example, about 10% to about 50%, at a wavelength in the visible spectrum (for example: 380 nm to 780 nm). In an optical display device in which the polarizing plate is mounted on an image sensor-forming portion of the optical display device, the depolarization region serves to make a photograph and/or an image clear upon photographing through an image sensor, such as a camera and the like.

The "polarization region" serves to display a screen in the optical display device through realization of typical polarization performance and has a lower light transmittance and a higher degree of polarization than the depolarization region. The polarization region may have a light transmittance of about 45% or less, for example, about 10% to about 45%, and a degree of polarization of about 90% or more, for example, about 90% to about 100%, in the visible spectrum.

The inventors of the present invention confirmed that the entirety of the polarizer formed with both the polarization region and the depolarization region has improved durability by releasing surface roughness defects in the depolarization region while improving durability of the depolarization region through control of the crystallinity ratio between the polarization region and the depolarization region among various properties of the polarizer.

In the polarizer, the depolarization region and the polarization region are not separated from each other and may be integrally formed with each other such that the depolarization region is consecutive to the polarization region. When the polarizer has a crystallinity ratio of about 60% or more, as calculated by Equation 1, the depolarization region can achieve sufficient realization of the aforementioned functions thereof while reducing variation in crystallinity between the polarization region and the depolarization region to improve durability of the entirety of the polarizer. In addition, the depolarization region allows less variation in light transmittance at high temperature and/or under high temperature/humidity conditions to exhibit durability while preventing failure, such as generation of bubbles, in a post-process of the polarizer.

In one embodiment, the polarizer may have a crystallinity ratio of about 60% to about 90%, as calculated by Equation 1. For example, the polarizer may have a crystallinity ratio of 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90%.

In another embodiment, the polarizer may have a crystallinity ratio of about 80% or more, as calculated by Equation 1. Within this range, the entirety of the polarizing plate can have improved durability while maintaining stable optical characteristics.

Here, "durability" means that the polarizer formed with at least the depolarization region or a polarizing plate including the polarizer does not suffer from shrinkage or minimizes shrinkage when left at high temperature and/or under high temperature/humidity conditions for a long period of time.

In one embodiment, the polarizer or the polarizing plate formed with at least the depolarization region may have a shrinkage rate of about 5% or less, preferably about 0% to about 1%, as calculated by Equation 2. Within this range, the polarizing plate even with the depolarization region has good durability to allow efficient realization of a polarization function and a depolarization function.

$$\text{Shrinkage rate} = |L2 - L1|/L1 \times 100 \quad \text{[Equation 2]}$$

(In Equation 2,

L1 is an initial length of the polarizer or the polarizing plate in an absorption axis direction thereof, and L2 is a length of the polarizer or the polarizing plate in the absorption axis direction thereof, after the polarizer or the polarizing plate is left at 85° C. for 120 hours).

For example, the polarizer or the polarizing plate formed with at least the depolarization region may have a shrinkage rate of 0%, 0.1%, 0.2%, 0.3%, 0.4%, 0.5%, 0.6%, 0.7%, 0.8%, 0.9%, 1%, 1.5%, 2%, 2.5%, 3%, 3.5%, 4%, 4.5%, or 5%, as calculated by Equation 2.

In one embodiment, the depolarization region may have a shrinkage rate of about 10% or less, as calculated by Equation 3, and other region excluding the depolarization region may have a shrinkage rate of about 5% or less, as calculated by Equation 3, in which the other region excluding the depolarization region has a lower shrinkage rate than the depolarization region.

$$\text{Shrinkage rate} = |L2-L1|/L1 \times 100 \quad \text{[Equation 3]}$$

(In Equation 3,
L1 is an initial length of a corresponding region in the absorption direction, and
L2 is a length of the corresponding region in the absorption axis direction thereof, after the corresponding region is left at 85° C. for 120 hours).

Herein, "absorption axis direction" may be the machine direction (MD) of the polarizer.

In addition, the polarizer has a crystallinity ratio of about 60% or more, as calculated by Equation 1, thereby minimizing variation in light transmittance of the depolarization region under high temperature (85° C.) and/or high temperature/humidity (60° C./95%) conditions. Since variation in light transmittance of the depolarization region causes deterioration in performance of other optical devices including a camera realized through the corresponding portion, it is necessary to maintain stable light transmittance of the depolarization region.

In the crystallinity ratio of Equation 1, crystallinity of each of the depolarization region and the polarization region is a value measured on a polyvinyl alcohol film containing dichroic dyes, such as iodine and the like, instead of being measured on a polyvinyl alcohol film (not containing dichroic dyes, such as iodine and the like).

In Equation 1, the crystallinity ratio may be obtained through XRD (X-ray Diffraction) analysis. In Equation 1, crystallinity may be obtained from a ratio of an area of a crystalline region to the sum of the area of the crystalline region and an area of a non-crystalline region on an XRD graph. Details of obtaining crystallinity are described in Examples.

In one embodiment, the depolarization region may have a total remaining-iodine content of about 0.1 wt % to about 1.5 wt %, specifically about 0.1 wt % to about 1.0 wt %. Within this range, the depolarization region can effectively maintain high light transmittance while maintaining durability. Here, "iodine" may mean all iodine-containing substances, such as $I_5^-$, $I_3^-$, $I^-$, and the like. The total remaining-iodine content of the depolarization region may be measured by a method described in Examples.

For example, the depolarization region may have a total remaining-iodine content of 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, or 1.5 wt %.

In one embodiment, the "depolarization region" may occupy an area ratio of about 20% or less, for example, about 10% or less, in the polarizer. Within this range, the depolarization region can be used as an image sensor-forming area in an optical display device.

In one embodiment, the "depolarization region" of the polarizer may occupy a portion of the entire area of the polarizer and may be formed so as not to include a corner of the polarizer. By way of example, referring to FIG. 2, the polarizer has a depolarization region 10 and a region 20 excluding the depolarization region, in which the depolarization region 10 is surrounded by the region 20.

In one embodiment, the depolarization region may have, for example, a circular shape, a semi-circular shape, an amorphous shape, and a rectangular shape, without being limited thereto.

In one embodiment, the depolarization region may have a curved or flat outer surface not formed with irregular roughness.

In one embodiment, the depolarization region may have a surface roughness (Ra) of about 3.0 nm or less, for example, about 0 nm to about 3.0 nm. Within this range, the depolarization region can realize a clear image through an image sensor by improving light transmittance. For example, the depolarization region has a surface roughness (Ra) of 0, 0.1 nm, 0.2 nm, 0.3 nm, 0.4 nm, 0.5 nm, 0.6 nm, 0.7 nm, 0.8 nm, 0.9 nm, 1.0 nm, 1.1 nm, 1.2 nm, 1.3 nm, 1.4 nm, 1.5 nm, 1.6 nm, 1.7 nm, 1.8 nm, 1.9 nm, 2.0 nm, 2.1 nm, 2.2 nm, 2.3 nm, 2.4 nm, 2.5 nm, 2.6 nm, 2.7 nm, 2.8 nm, 2.9 nm, or 3.0 nm.

In the polarizer or the polarizing plate, the depolarization region may have a transmittance variation rate of about 5% or less, for example, about 0% to about 3%, as calculated by Equation 4, when left at high temperature and/or under high temperature/humidity conditions for a long period of time. Within this range, the polarizer or the polarizing plate has improved reliability to increase lifespan of an optical display device.

$$\text{Transmittance variation rate} = |TS2-TS1|/TS1 \times 100 \quad \text{[Equation 4]}$$

(In Equation 4,
TS1 is the light transmittance of the depolarization region at a wavelength of 550 nm, and
TS2 is the light transmittance of the depolarization region at a wavelength of 550 nm after being left at 85° C. for 120 hours).

The polarizer may have a thickness of about 10 µm to about 50 µm, specifically about 10 µm to about 40 µm. Within this range, the polarizer can be used in the polarizing plate.

In one embodiment, the polarizer may have a boric acid content of about 10 wt % to about 50 wt %, specifically about 20 wt % to about 30 wt %. Within this range, the entirety of the polarizer can have further improved durability.

For example, the polarizer may have a boric acid content of about 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %.

In one embodiment, the polarizer may have a potassium iodide content of about 1 wt % to about 10 wt %, specifically about 1 wt % to about 5 wt %. Within this range, the entirety of the polarizer can have further improved durability. For example, the polarizer may have a potassium iodide content of about 1 wt %, 2 wt %, 3 wt %, 4 wt %, 5 wt %, 6 wt %, 7 wt %, 8 wt %, 9 wt %, or 10 wt %.

In one embodiment, the polarizer may have a zinc salt, for example, zinc sulfate ($ZnSO_4$) content of about 0.01 wt % to about 1 wt %, specifically about 0.01 wt % to about 0.5 wt %. Within this range, the entirety of the polarizer can have further improved durability. For example, the polarizer may have a zinc salt content of about 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, or 1 wt %.

In the polarizer, each of the boric acid content, the potassium iodide content, and the zinc salt content may be realized through adjustment in the content thereof in a process of manufacturing the polarizer.

Next, a method of manufacturing the polarizer will be described.

The polarizer may be manufactured by dyeing a polyvinyl alcohol film with at least one selected from among iodine and dichroic dyes, stretching the dyed polyvinyl alcohol film, and forming a depolarization region through irradiation of a predetermined region of the polyvinyl alcohol film with pulsed UV beams.

First, the dyed and stretched polyvinyl alcohol film is manufactured.

The dyed and stretched polyvinyl alcohol film may be manufactured through dyeing, stretching, cross-linking, and color correction processes. In the method of manufacturing the polarizer according to the present invention, dyeing and stretching may be performed in any sequence. That is, the polyvinyl alcohol film may be dyed and then stretched or vice versa, or may be simultaneously subjected to dyeing and stretching.

The polyvinyl alcohol film may be a typical polyvinyl alcohol film used in manufacture of a typical polarizer. Specifically, the polyvinyl alcohol film may be a film produced from polyvinyl alcohol or derivatives thereof. The polyvinyl alcohol film may have a degree of polymerization of about 1,000 to about 5,000, a degree of saponification of about 80 mol % to about 100 mol %, and a thickness of about 1 μm to about 30 μm, specifically about 3 μm to about 30 μm. Within this range, the polyvinyl alcohol film can be used in manufacture of a thin polarizer.

The polyvinyl alcohol film may be subjected to washing with water and swelling before dyeing and stretching. The polyvinyl alcohol film may be subjected to washing with water to remove foreign matter from the surface of the polyvinyl alcohol film. The polyvinyl alcohol film may be subjected to swelling to allow more efficient dyeing or stretching of the polyvinyl alcohol film. Swelling may be realized by leaving the polyvinyl alcohol film in an aqueous solution of a swelling bath, as well-known to those skilled in the art. The temperature of the swelling bath and swelling time are not particularly limited. The swelling bath may further include boric acid, an inorganic acid, a surfactant, and the like, and the content of these components may be adjusted.

The polyvinyl alcohol film may be dyed by dipping the polyvinyl alcohol film in a dyeing bath containing iodine and/or dichroic dyes. In the dying process, the polyvinyl alcohol film is dipped in a dyeing solution, which may be an aqueous solution containing iodine and/or dichroic dyes. Specifically, iodine is provided from an iodine-based dye. The iodine-based dye may include at least one selected from among potassium iodide, hydrogen iodide, lithium iodide, sodium iodide, zinc iodide, lithium iodide, aluminum iodide, lead iodide, and copper iodide. The dying solution may be an aqueous solution containing about 1 wt % to about 5 wt % of iodine and/or dichroic dyes. Within this range, the polarizer has a degree of polarization within a predetermined range to be used in a display device.

The dyeing bath may have a temperature of about 20° C. to about 45° C. and the polyvinyl alcohol film may be dipped in the dyeing bath for about 10 seconds to about 300 seconds. Within this range, it is possible to realize a polarizer having a high degree of polarization.

The dyed polyvinyl alcohol film may be stretched in a stretching bath to exhibit polarization through alignment of iodine and/or dichroic dyes in the polyvinyl alcohol film. Specifically, stretching may be realized by dry stretching and wet stretching. Dry stretching may be performed by inter-roll stretching, compression stretching, hot-roll stretching, and the like, and wet stretching may be performed in a wet stretching bath containing water at about 35° C. to about 65° C. The wet stretching bath may further contain boric acid to improve the stretching effect.

The polyvinyl alcohol film may be stretched at a predetermined stretching ratio, specifically a total stretching ratio of about 5 times to about 7 times, more specifically about 5.5 times to about 6.5 times, an initial length thereof. Within this range, the polyvinyl alcohol film can prevent cutting, wrinkling and the like upon stretching, and can realize a polarizer having improved polarization with transmittance. Stretching may be performed by uniaxial stretching through single stage stretching or multi-stage stretching such as bi-stage stretching, tri-stage stretching, and the like, thereby preventing fracture of the polyvinyl alcohol film in manufacture of a thin polarizer.

Although dyeing and stretching of the polyvinyl alcohol film are performed in the stated sequence in the above embodiment, dyeing and stretching may be performed in the same reaction bath.

Before or after the dyed polyvinyl alcohol film is stretched, the polyvinyl alcohol film may be subjected to crosslinking in a crosslinking bath. Crosslinking is a process that allows the polyvinyl alcohol film to be more strongly dyed with iodine and/or dichroic dyes, and may be performed using boric acid as a crosslinking agent. In order to enhance the crosslinking effect, the crosslinking bath may further contain a phosphoric acid compound, potassium iodide, or the like.

The dyed and stretched polyvinyl alcohol film may be subjected to color correction in a color correction bath. In color correction, the dyed and stretched polyvinyl alcohol film is dipped in the color correction bath filled with a color correction solution containing potassium iodide. As a result, the polarizer has reduced color values and iodine cations (P) are removed from the polarizer, thereby improving durability. The color correction bath may have a temperature of about 20° C. to about 45° C. and the polyvinyl alcohol film may be dipped therein for about 10 seconds to about 300 seconds.

Next, the dyed and stretched polyvinyl alcohol film is partially irradiated with pulsed UV beams, thereby providing a polarizer partially formed with a depolarization region.

The polyvinyl alcohol film is irradiated with UV light in the form of pulsed beams at a continuous wavelength of about 200 nm to about 400 nm, thereby reducing damage to the depolarization region of the polyvinyl alcohol film dyed with iodine and/or dichroic dyes in formation of the depolarization region, as compared with irradiation with typical femtosecond or picosecond laser beams.

Irradiation with pulsed UV beams may be performed once to 10 times using a light source having an energy power of about 300V to about 500V at a pulse frequency of about 0.5 Hz to about 2 Hz for about 10 ms (millisecond) to about 15 ms. Within these ranges, the polyvinyl alcohol film can provide a polarizer satisfying the crystallinity ratio of Equation 1 according to the present invention. Upon irradiation with the corresponding light, a mask of a desired shape is placed in close contact with the dyed and stretched polyvinyl alcohol film, whereby a portion of the polarizer not requiring polarization can be controlled to maintain the corresponding light transmittance.

In one embodiment, the depolarization region may be formed by irradiation with pulsed UV beams alone. In another embodiment, the depolarization region may be formed through combination of irradiation with pulsed UV beams and irradiation with femtosecond laser beams.

For example, the depolarization region may be formed by irradiation with pulsed UV beams and then irradiation with femtosecond laser beams, by irradiation with femtosecond laser beams and then irradiation with pulsed UV beams, or by simultaneous irradiation with pulsed UV beams and femtosecond laser beams. Preferably, the depolarization region is formed by irradiation with pulsed UV beams, followed by irradiation with femtosecond laser beams. Here, it should be noted that irradiation with femtosecond laser beams is performed so as not to affect the depolarization region.

For example, the femtosecond laser beams may be delivered under the following conditions: a beam size of about 10 μm to about 30 μm, a pulse frequency of about 200 kHz to about 400 kHz, and an energy density per pulse of about 0.1 $J/cm^2$/pulse to about 0.5 $J/cm^2$/pulse.

In one embodiment, the femtosecond laser beams may include at least two types of femtosecond laser beams having wavelengths selected from among the wavelength range of about 340 nm to about 346 nm and the wavelength range of about 510 nm to about 520 nm, respectively.

Light in the wavelength range of about 510 nm to about 520 nm decomposes iodine and the dichroic dyes in the polarizer through transfer of iodine and the dichroic dyes from a ground state to an excited state, thereby enabling depolarization in a region irradiated therewith.

When the polarizer is irradiated with at least two types of femtosecond laser beams having wavelengths respectively selected from among the wavelength range of about 340 nm to about 346 nm and the wavelength range of about 510 nm to about 520 nm, the polarization function in the region irradiated therewith is released while improving light transmittance and reliability of the polarizer or the polarizing plate under high temperature/humidity conditions.

Specifically, in the wavelength range of about 340 nm to about 346 nm, femtosecond laser beams having a wavelength of about 340 nm, about 341 nm, about 342 nm, about 343 nm, about 344 nm, about 345 nm, or about 346 nm, preferably about 343 nm, may be selected. Specifically, in the wavelength range of about 510 nm to about 520 nm, femtosecond laser beams having a wavelength of about 510 nm, about 511 nm, about 512 nm, about 513 nm, about 514 nm, about 515 nm, about 516 nm, about 517 nm, about 518 nm, about 519 nm, or about 520 nm, preferably about 515 nm, may be selected. Optimally, femtosecond laser beams having a wavelength of about 343 nm and a wavelength of about 515 nm may be delivered.

The method of manufacturing the polarizer according to the present invention may further include at least one of heat treatment of the depolarization region and washing the depolarization region with water after irradiation with the pulsed UV beams or combination of irradiation with pulsed UV beams and irradiation with laser beams. As a result, it is possible to improve reliability of the depolarization region by preventing light transmittance of the depolarization region from returning to light transmittance of the corresponding region before formation of the depolarization region, that is, to light transmittance of the region excluding the depolarization region when the depolarization region of the polarizer is left at high temperature and/or under high temperature/humidity conditions for a long period of time.

Heat treatment may include heat treatment of the polarizer including the depolarization region at about 70° C. to about 90° C. for about 1 min to about 10 min. Within this range, it is possible to enhance reliability of the depolarization region while minimizing an effect on the other region excluding the depolarization region.

Washing with water may include brining the polarizer including the depolarization region into contact with water at a temperature of about 30° C. to about 60° C. for about 1 min to about 10 min. Contact of the polarizer with water may be realized by typical methods, such as dipping the polarizer in water, washing the polarizer with water, and the like, which are known to those skilled in the art.

Next, the protective film will be described.

The protective film may be a typical protective film used as a protective film for polarizers. By way of example, the protective film may include a protective film formed of at least one resin selected from among cellulose resins including triacetylcellulose (TAC) and the like, polyester resins including polyethylene terephthalate, polybutylene terephthalate, polyethylene naphthalate, polybutylene naphthalate, and the like, cyclic polyolefin (COP) resins, polycarbonate resins, polyether sulfone resins, polysulfone resins, polyamide resins, polyimide resins, polyolefin resins, polyarylate resins, polyvinyl alcohol resins, polyvinyl chloride resins, polyvinylidene chloride and acrylic resins. The protective film may have a thickness of about 10 μm to about 100 μm, for example, about 10 μm to about 60 μm. Lamination may be performed using a bonding agent by a typical method known to those skilled in the art.

The protective film may have a degree of moisture permeation of about 100 $g/m^2$·day or less, for example, about 0 to about 50 $g/m^2$·day. Within this range, the protective film can have a low degree of moisture permeation to improve reliability of the polarizer including the depolarization region. In one embodiment, the protective film may include a cyclic olefin polymer (COP) or acrylic protective film.

Next, an optical display device according to one embodiment of the invention will be described.

The optical display device according to the present invention includes the polarizing plate according to the present invention. The optical display device may include a liquid crystal display, an organic light emitting diode display, and the like.

MODE FOR INVENTION

Next, the present invention will be described in more detail with reference to some examples. However, it should be noted that these examples are provided for illustration only and are not to be construed in any way as limiting the invention.

Detailed specifications of components used in Examples and Comparative Examples are as follows.

(1) Material of polarizer: Polyvinyl alcohol film (VF-PE3000, thickness: 30 μm, Kuraray Co., Ltd., Japan)
(2) Protective film: Triacetylcellulose film (KC4UYW, thickness: 40 μm, Konica Co., Ltd., Japan)

Example 1

A polyvinyl alcohol film washed with water was subjected to swelling treatment in a swelling bath filled with water at 30° C.

Figure 3:
FIG. 3 is a side view of a polarizing plate including the polarizer, according to one embodiment of the present invention.

After swelling treatment, the polyvinyl alcohol film was dyed with an aqueous solution containing 3 wt % of potassium iodide in a dyeing bath at 30° C. for 30 seconds to 200 seconds. The dyed polyvinyl alcohol film was passed through a wet crosslinking bath filled with an aqueous solution containing 3 wt % of boric acid at 30° C. to 60° C. Thereafter, the polyvinyl alcohol film was stretched in an aqueous solution containing 3 wt % of boric acid at 50° C.

to 60° C. to reach a total stretching ratio of 6 times an initial length thereof, thereby producing a polarizer (thickness: 20 μm). A laminate was prepared by bonding protective films to both surfaces of the prepared polarizer (see FIG. 3) using a bonding agent (Z-200, Nippon Goshei Co., Ltd.).

The laminate was cut to a predetermined size and some region of the cut laminate was irradiated once with pulsed UV beams under conditions of 400 V, 1 Hz, and 13 ms, thereby preparing a polarizing plate formed with a depolarization region (circular shape having a radius of 5 mm).

Example 2

A polarizing plate formed with a depolarization region was prepared in the same manner as in Example 1 except that irradiation with pulsed UV beams was performed five times under conditions of 400 V, 1 Hz, and 13 ms.

Example 3

A polarizing plate formed with a depolarization region was prepared in the same manner as in Example 1 except that irradiation with pulsed UV beams was performed ten times under conditions of 400 V, 1 Hz, and 13 ms.

Example 4

A polarizing plate was prepared in the same manner as in Example 1 except that irradiation with pulsed UV beams was performed once under conditions of 400 V, 1 Hz, and 13 ms, followed by irradiation with femtosecond laser beams having a beam size of 20 μm at wavelengths of 343 nm and 515 nm under conditions of 330 femtoseconds, a pulse frequency of 400 kHz, and an energy density per pulse of 0.25 J/cm$^2$/pulse.

Example 5

A polarizing plate was prepared in the same manner as in Example 1 except that irradiation with pulsed UV beams was performed once under conditions of 400 V, 1 Hz, and 13 ms, followed by washing the polarizer with water at 50° C. to 60° C. for 3 minutes to 10 minutes.

Comparative Example 1

A polarizing plate was prepared in the same manner as in Example 1 except that irradiation with femtosecond laser beams at wavelengths of 343 nm and 515 nm was performed without irradiation with pulsed UV beams.

Comparative Example 2

A polarizing plate was prepared in the same manner as in Example 1 except that irradiation with picosecond laser beams at a wavelength of 532 nm was performed without irradiation with pulsed UV beams.

Comparative Example 3

A polarizing plate was prepared in the same manner as in Example 1 except that a depolarization region was formed through treatment with a sodium hydroxide solution as a decolorizer instead of irradiation with pulsed UV beams. The depolarization region had irregular roughness on an outer surface thereof.

The polarizing plates of Examples and Comparative Examples were evaluated as to the following properties and results are shown in Table 1.

(1) Crystallinity ratio of Equation 1 (unit: %): The polarizer was separated from each of the polarizing plates of Examples and Comparative Examples, and crystallinity of each of the depolarization region and the polarization region was measured by an XRD analysis method, followed by calculation of the crystallinity ratio according to Equation 1.

XRD analysis of the depolarization region was performed using an X-ray diffraction analyzer (Panalytical, X'PERT PRO) under conditions of generator settings: 40 mA and 40 kV, step size: 0.05 [2° Theta], scan step time: 5.0 seconds, and measurement temperature: 25.00° C. XRD analysis of the polarization region was also performed in the same manner.

XRD analysis of the depolarization region was performed as follows. For convenience, XRD analysis of the depolarization region of Example 1 is described. XRD analysis of the depolarization regions of Examples 2 to 5 and Comparative Examples 1 to 3 were performed in the same manner. FIG. 1a shows results of XRD analysis of the depolarization region of Example 1.

In FIG. 1a, a thin solid line indicates an XRD analysis result.

At a position [2° Theta] of 20°, an integrated area under a dotted line on an XRD graph (indicated by a dotted line in FIG. 1a) was obtained. Since the position [2° Theta] of 20° indicates a crystalline region in the depolarization region, the position [2° Theta] of 20° was selected.

At a position [2° Theta] of 25°, an integrated area under a dashed dotted line on the XRD graph (indicated by a dashed dotted line in FIG. 1a) was obtained. Since the position [2° Theta] of 25° indicates a no-crystalline area in the depolarization region, the position [2° Theta] of 25° was selected.

Crystallinity of the depolarization region could be obtained by calculating a ratio of an area at a position [2° Theta] of 20° to the total area, that is, (Integrated area on XRD graph at position [2° Theta] of 20°)/(Integrated area on XRD graph at position [2° Theta] of 20°+Integrated area on XRD graph at position [2° Theta] of 25°).

XRD analysis of the polarization region will be described with reference to FIG. 1b. In FIG. 1b, a thin solid line indicates an XRD analysis result. Crystallinity of the polarization region could be obtained in the same manner as in calculation of crystallinity of the depolarization region.

(2) Iodine content in depolarization region (unit: wt %): The polarizer was separated from each of the polarizing plates of Examples and Comparative Examples, followed by measuring the iodine content in the depolarization region through iodine titration and XRF (X-ray fluorescence) analysis. Here, "iodine" refers to all iodine-containing substances, such as $I_5^-$, $I_3^-$, $I^-$, and the like.

(3) Surface roughness (unit: nm): The polarizer was separated from each of the polarizing plates of Examples and Comparative Examples, followed by measuring surface roughness (Ra) of the depolarization region using a super-precision microscope (Keyence Co., Ltd.). Surface roughness of 3.0 nm or less was rated as good and surface roughness of greater than 3.0 nm was rated as poor.

(4) Durability: Each of the polarizing plates of Examples and Comparative Examples was cut into a square specimen having a size of 2 cm×2 cm (MD of polarizer×TD of polarizer). Here, the specimen includes a depolarization region and other region excluding the depolarization region (the depolarization region had an area ratio of 20% in the specimen).

Thereafter, the specimen was left at 85° C. for 120 hours, followed by measurement of the MD length of the specimen. After the specimen was left at 85° C. for 120 hours, a variation of an MD length of the specimen to an initial MD length of the specimen was measured. As calculated by Equation 2, a shrinkage rate of 5% or less was rated as good and a shrinkage rate of greater than 5% was rated as poor.

(5) Transmittance variation rate (unit: %): Each of the polarizing plates of Examples and Comparative Examples was cut into a square specimen having a size of 2 cm×2 cm (MD of polarizer×TD of polarizer). The specimen includes a depolarization region. Light transmittance of the depolarization region was measured at a wavelength of 550 nm.

Thereafter, the specimen was left at 85° C. for 120 hours, followed by measurement of light transmittance at a wavelength of 550 nm. Transmittance variation rate was calculated by Equation 4.

(6) Remaining-iodine content (unit: wt %): Each of the polarizing plates of Examples and Comparative Examples was cut into a square specimen having a size of 2 cm×2 cm (MD of polarizer×TD of polarizer), which in turn was dipped in water at 50° C. to 60° C. for 3 min to 10 min, followed by washing with water. Thereafter, the specimen was dried and the remaining iodine content of the depolarization region was measured through iodine titration and XRF analysis.

made by those skilled in the art without departing from the spirit and scope of the present invention.

The invention claimed is:

1. A polarizing plate comprising: a polarizer; and a protective film formed on at least one surface of the polarizer,
   wherein the polarizer is formed with a depolarization region on at least part thereof and has a crystallinity ratio of about 60% or more, as calculated by Equation 1:

$$\text{Crystallinity ratio} = DC2/DC1 \times 100,$$ [Equation 1]

where $DC1$ is a crystallinity of a region of the polarizer other than the depolarization region, and
   $DC2$ is a crystallinity of the depolarization region of the polarizer.

2. The polarizing plate according to claim 1, wherein the depolarization region has a total remaining-iodine content of about 0.1 wt % to about 1.5 wt %.

3. An optical display device comprising the polarizing plate according to claim 2.

4. The polarizing plate according to claim 1, wherein the depolarization region occupies an area ratio of about 20% or less in the polarizer.

5. An optical display device comprising the polarizing plate according to claim 3.

6. The polarizing plate according to claim 1, wherein the depolarization region has a surface roughness (Ra) of about 3.0 nm or less.

TABLE 1

| | Example | | | | | Comparative Example | | |
|---|---|---|---|---|---|---|---|---|
| | 1 | 2 | 3 | 4 | 5 | 1 | 2 | 3 |
| Eq. 1 | 80 | 75 | 65 | 70 | 80 | 45 | 30 | 58 |
| Iodine content | 3.70 | 3.65 | 3.60 | 3.10 | 3.70 | 3.55 | 3.45 | 0.30 |
| Surface roughness | 1.45 (good) | 1.60 (good) | 1.65 (good) | 1.82 (good) | 1.45 (good) | 5.55 (poor) | 6.32 (poor) | 4.95 (poor) |
| Durability | Good | Good | Good | Good | Good | Poor | Poor | Good |
| Transmittance variation rate | 1.5 | 1.8 | 1.9 | 2.2 | 1.0 | 70 | 75 | 2.2 |
| Remaining-iodine content | 0.42 | 0.36 | 0.25 | 0.21 | 0.10 | 2.11 | 1.95 | 0.20 |

As shown in Table 1, despite the presence of the depolarization region, the polarizing plate according to the present invention suffered from no or slight shrinkage of the polarizing plate to secure good durability of the entirety of the polarizing plate when left at high temperature, reduced variation in light transmittance of the depolarization region to secure high reliability after testing at high temperature, and suppressed surface roughness failure in the depolarization region.

On the contrary, as shown in Table 1, it could be seen that it was not easy to achieve the crystallinity ratio of Equation 1 within the range of the present invention by a typical femtosecond irradiation, picosecond irradiation or chemical method. The polarizing plates of Comparative Examples 1 to 3 failing to satisfy the crystallinity ratio of Equation 1 within the range of the present invention did not provide all of the effects of the present invention. In addition, although not shown in Table 1, the polarizing plate of Comparative Example 3 suffered from failure, such as generation of bubbles in a post-process of the polarizer.

It should be understood that various modifications, changes, alterations, and equivalent embodiments can be 7. An optical display device comprising the polarizing plate according to claim 6.

8. The polarizing plate according to claim 1, wherein the depolarization region has a curved or flat outer surface not formed with irregular roughness.

9. An optical display device comprising the polarizing plate according to claim 8.

10. The polarizing plate according to claim 1, wherein the polarizer further comprises a polarization region excluding the depolarization region and the polarizing plate has a shrinkage rate of about 5% or less, as calculated by Equation 2:

$$\text{Shrinkage rate} = |L2-L1|/L1 \times 100,$$ [Equation 2]

where $L1$ is an initial length of the polarizer or the polarizing plate in an absorption axis direction thereof, and
$L2$ is a length of the polarizer or the polarizing plate in the absorption axis direction thereof, after the polarizer or the polarizing plate is left at 85° C. for 120 hours.

11. The polarizing plate according to claim 10, wherein the depolarization region and the polarization region are consecutive to each other.

12. An optical display device comprising the polarizing plate according to claim 11.

13. An optical display device comprising the polarizing plate according to claim 10.

14. An optical display device comprising the polarizing plate according to claim 1.

* * * * *